United States Patent [19]
Lechleider

[11] Patent Number: 5,181,198
[45] Date of Patent: Jan. 19, 1993

[54] COORDINATED TRANSMISSION FOR TWO-PAIR DIGITAL SUBSCRIBER LINES

[75] Inventor: Joseph W. Lechleider, Mendham Township, Morristown, Morris County, N.J.

[73] Assignee: Bell Communications Research, Inc., Livingston, N.J.

[21] Appl. No.: 668,087

[22] Filed: Mar. 12, 1991

[51] Int. Cl.$^5$ ............................ H04B 3/23; H04B 3/32
[52] U.S. Cl. ...................................... 370/32.1; 370/32; 370/27; 375/60; 375/99; 375/102; 379/410
[58] Field of Search ................ 370/32.1, 31, 32, 6, 370/21, 24, 19; 375/7, 11, 14, 40, 34, 57, 58, 99-100, 102, 101, 60; 379/406, 410, 411, 93, 402; 455/63, 65, 295, 303

[56] References Cited

U.S. PATENT DOCUMENTS

| | | | |
|---|---|---|---|
| 4,112,370 | 9/1978 | Monsen | 370/6 |
| 4,370,745 | 1/1983 | Miller | 375/40 |
| 4,535,206 | 8/1985 | Falconer | 370/32.1 |
| 4,615,025 | 9/1986 | Vry | 370/32 |
| 4,995,031 | 2/1991 | Aly et al. | 370/32.1 |

OTHER PUBLICATIONS

"Generic Requirements for ISDN Basic Access Digital Subscriber Lines," Bellcore Technical Referebce TR-NWT-000393, Issue 2, Jan. 1991.
"Broad Signal Constraints for Management of the Spectrum in Telephone Loop Cables," J. W. Lechleider, IEEE Trans. on Comm., vol. COM-34, No. 7, pp. 641-646, Jul. 1986.
"Digital Transmissions Systems and Networks," M. J. Miller et al., pp. 173-215, published by Computer Science Press 1987.
"Digital Communications," J. G. Proakis, pp. 381-386 published by McGraw-Hill 1983.
"Digital Subscriber Line Terminals for Use with Correlated Line Codes," J. W. Lechleider, IEEE Trans. on Comm., vol. COM-35, No. 10, pp. 1029-1036, Oct. 1987.

Primary Examiner—Douglas W. Olms
Assistant Examiner—H. Kizou
Attorney, Agent, or Firm—Leonard Charles Suchyta; John T. Peoples

[57] ABSTRACT

A communication system for coordinated transmission of signals from two data sources over a pair of transmission lines includes a central office transceiver and a remote transceiver terminating the corresponding ends of the pair of transmission lines. Each transceiver includes a transmitter with a complementary receiver. The signal amplitudes propagated on the lines are related to each other according to a prescribed relation that effects enhanced signal-to-noise ratio. The transmitter includes a set of amplification factors determined by the prescribed relation; similarly, the receiver also includes two sets of amplication factors to perform the dual to the transmitter operation. The transmitter incorporates a two-dimensional generalization to a conventional echo canceler, namely, an implementation to cancel both echo and near-end crosstalk interfering components. Also, the receiver incorporates a two-dimensional generalization to a conventional decision feedback equalizer, namely, an implementation to cancel both pre-cursor and post-cursor intersymbol interference as well as far-end crosstalk.

14 Claims, 7 Drawing Sheets

COORDINATED TRANSMISSION FOR TWO-PAIR DIGITAL SUBSCRIBER LINES

FIELD OF THE INVENTION

The invention relates generally to digital systems and, more specifically, to the transmission of digital information over two coordinated propagation paths, and to concomitant techniques for encoding and decoding the digital information.

BACKGROUND OF THE INVENTION

A Digital Subscriber Line (DSL) is a technology that effects digital communication to customers over the existing, twisted-pair telephone loop plant. The motivation behind the development of DSLs is the need to provide digital service to customers as part of the Integrated Services Digital Network (ISDN), which will become an international standard for digital communications. There are two kinds of ISDN access: Basic Access and Primary Access. The Basic Access signal is composed of up to 144 kbit/s of bidirectional customer data ("2B+D" channels), plus one bidirectional channel of 16 kbit/s to support provisioning and maintenance operations. This makes the total data rate of 160 kbit/s in each of two directions of transmission. Primary Access uses two cable pairs in a simplex fashion at 1.536M bit/s with a simplex of 8 kbit/s for a total transmission rate of 1.544M bit/s.

The current loop plant environment, including bridged taps and mixed metallic wire gauges, intended originally for voice frequency transmission, presents a complex environment for wideband transmission such as digital data services. In order to economically provide Basic Access, the DSL must be implemented without conditioning the loop plant (e.g., by removing bridged taps or rearranging pairs), notwithstanding the detrimental effects of bridged taps and gauge changes. Furthermore, no special engineering or operations can be associated with DSL installation.

As presently outlined in the Bellcore Technical Reference TR-NWT-000393, Issue 2, dated January 1991 and entitled "Generic Requirements for ISDN Basic Access Digital Subscriber Lines," which is incorporated herein by reference, the DSL is made up of a master digital transmitter/receiver ("transceiver") and a slave digital transceiver, both being connected by a metallic twisted-pair loop. The DSL uses the echo canceler-with-hybrid principle well-known in the art to provide full-duplex (i.e., simultaneous two-way) signal transmission over a two-wire non-loaded loop. The echo canceler technique is used to remove echoes of the transmitted signal that have mixed with the received signal; the echoes are reflections of the transmitted signal from discontinuities, such as bridged taps and gauge changes, or from line impedance mismatches and hybrid leakage. This permits a relatively weak received signal to be accurately detected and is the means for avoiding the use of a separate wire pair for each direction of transmission, thereby providing a cost-effective arrangement. A quaternary line code ("2B1Q") code is employed for signal propagation. This code converts blocks of two consecutive signal bits, representative of the signal generated by the customer, into a single four-level pulse for transmission. As a result, the loop baud is half of the information rate.

Primary Access currently uses the T1 line technology with a repeatered line operating at 1.544M bit/s. This technology requires special engineering of loops and removal of bridged taps and minimization of the occurrence of gauge changes. Exploratory work on the duplex system used in Basic Access suggested that it was possible to use a system similar to the Basic Access system operating at 800 k bit/s to provide a single Primary Access channel. Such an arrangement could also be used to provide service at 1.544M bit/s without special engineering, design or loop conditioning. The range of the system would be less than the Basic Access system because of the increased bandwidth with concomitant increased loss. However, it was determined that a greater range would be desirable if it could be achieved by improved signal processing rather than by loop conditioning. To achieve this range, it is especially important to improve the received signal-to-noise ratio.

SUMMARY OF THE INVENTION

In order to achieve the required improvement in the signal-to-noise ratio as well as other enhancements and benefits, the circuitry and concomitant method in accordance with the present invention relates loop signal amplitudes transmitted on two cable pairs to each other and processes the received signals according to the prescribed relation between the amplitudes.

In accordance with the broad aspect of the present invention, the transmission system includes a central office transceiver and a remote transceiver terminating the corresponding ends of a pair of transmission lines. Each transceiver includes a transmitter and a complementary receiver. The transmitter propagates first and second data sequences originated by first and second data sources, respectively, over the pair of transmission lines. The lines are coupled to the transmitter by first and second hybrid arrangements which each have transmit and receive ports. The receive ports of the hybrid arrangements provide first and second received line signals, respectively, each having echo and NEXT interfering components.

Broadly, the transmitter includes three main elements, namely, line buffer means, modulation means, and canceler means. The line buffer means, which is coupled to the first and second data sources, generates two composite sequences, the first composite sequence being formed from a combination of separately amplified versions of the two data sequences, and the second composite sequence being formed from another combination of separately amplified versions of the two data sequences. The modulation means, which is coupled to the line buffer means, generates first and second line carrier signals; modulates the first line carrier signal with the first composite sequence to produce a first modulation signal; modulates the second line carrier signal with the second composite sequence to produce a second modulation signal; and delivers the modulation signals to the transmit ports of the corresponding hybrid arrangements. The canceler means, which connects to the line buffer means and the receive ports of the hybrid arrangements, generally serves as a filter to cancel the echo and NEXT components in the received line signals.

The receiver detects the first and second line signals to produce first and second received data sequences. The line signals are emitted by the respective receive ports of the first and second hybrids; moreover, each of the line signals includes FEXT, pre-cursor (line distortion), and post-cursor intersymbol interfering components.

The receiver includes three main elements, namely, receive buffer means, combiner means, and canceler means. The buffer means provides equalization to the received line signals to account for gross characteristics of the transmission lines. The buffer means then separately samples the received line signals to produce first and second input sequences. A feed forward filter section of a decision feedback equalizer, in cascade with the sampler, corrects for line distortion to produce a pair of compensated sequences corresponding to the received line signals. The combiner means, which is coupled to the receive buffer means, generates first and second combined sequences, the first combined sequence being formed from a combination of separately amplified versions of the compensated sequences, and then the first combined sequence is threshold detected to produce the first received sequence; in addition, the second combined sequence is formed from another combination of separately amplified versions of the compensated sequences and then this combined sequence is threshold detected to produce the second received sequence. Finally, the canceler means, which is coupled to the receive buffer means and the combiner means and is responsive to received sequences, cancels the FEXT and post-cursor intersymbol interfering components manifested by the receiver circuitry.

The organization and operation of the invention will be better understood from a consideration of the detailed description of the illustrative embodiments thereof, which follow, when taken in conjunction with the accompanying drawing.

DETAILED DESCRIPTION

Overview of the Present Invention

Figure 1:
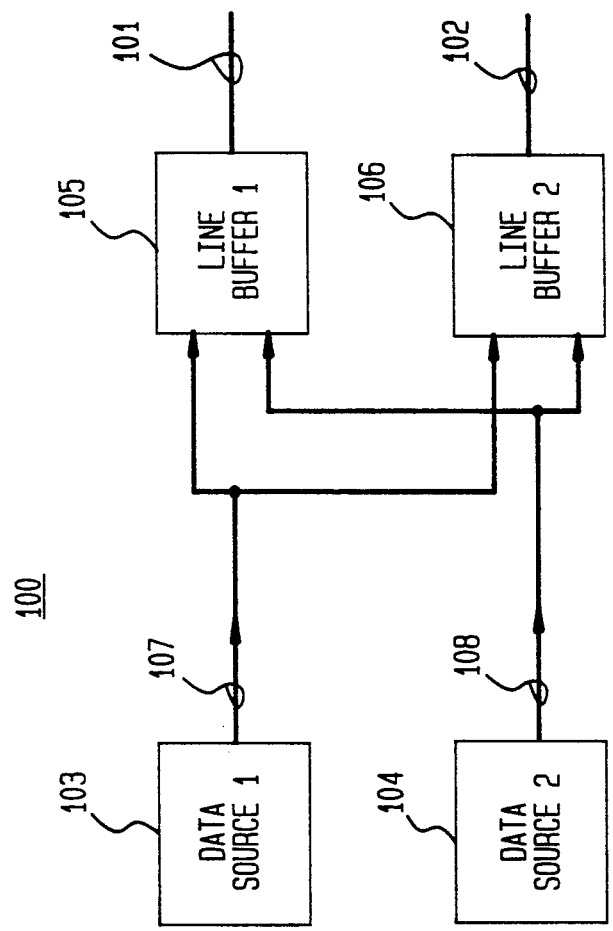
FIG. 1 is a high-level block diagram of an illustrative embodiment of a transmitter in accordance with the present invention.

As illustrated by the block diagram of FIG. 1, coordinated digital transmitter 100 in accordance with the transmission aspect of the present invention utilizes two bidirectional loop cable pairs 101 and 102 in a dual-duplex manner to provide two separate, uncoupled logical subchannels wherein each of these subchannels uses both physical pairs. This is effected by supplying each data sequence emanating from independent data sources 103 and 104, via leads 107 and 108, to two line buffers 105 and 106 that couple to cable pairs 101 and 102, respectively. Line buffer 105 separately amplifies the sequences from sources 103 and 104, and transmits a loop carrier signal over loop 101 corresponding to the amplified sequences. Similarly, line buffer 106 separately amplifies each of the sequences from the data sources, and transmits a loop carrier signal over loop 102 corresponding to these latter amplified sequences. With the arrangement of system 100, the transmitted signals originated by sources 103 and 104 may be described, in mathematical terms, as two-dimensional vectors propagating over the decoupled subchannels, as discussed in detail below.

Figure 2:
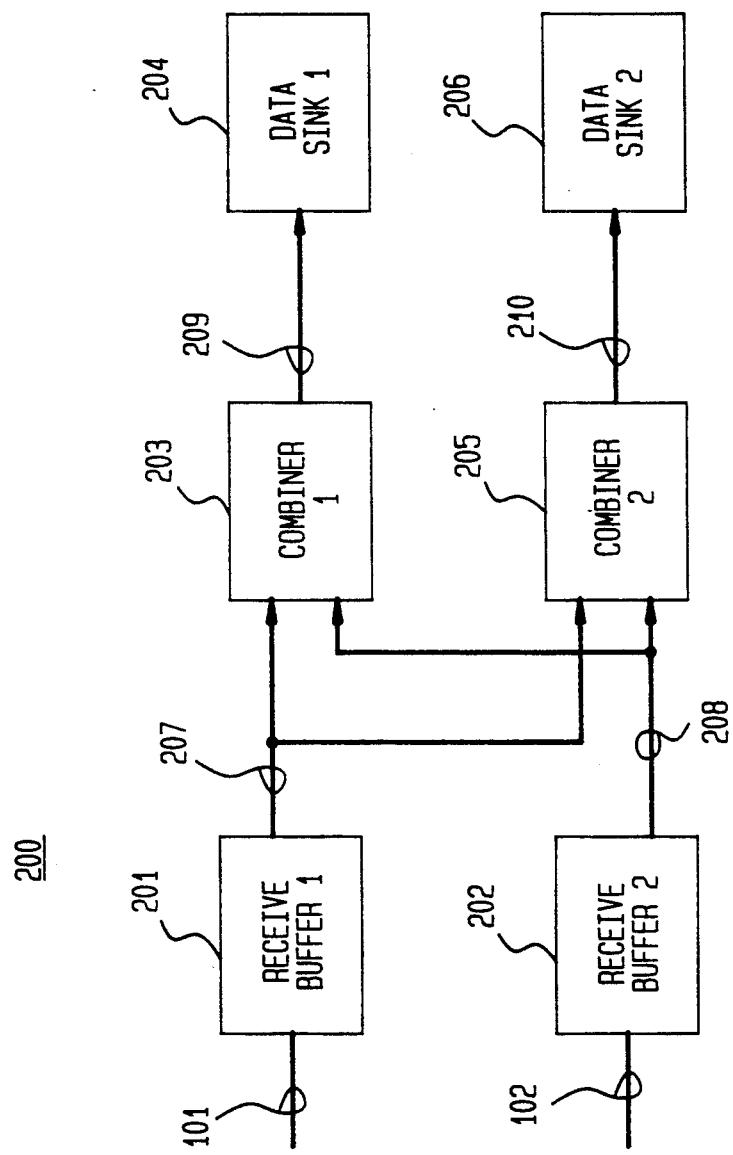
FIG. 2 is a high-level block diagram of an illustrative embodiment of a receiver in accordance with the present invention.

As shown by the block diagram of FIG. 2, digital receiver 200 for coordinated transmission in accordance with the receiver aspect of the present invention is the dual of transmitter 100. The line signals arriving on loop cables pairs 101 and 102 are generally corrupted by noise. At the front end of receiver 200, receive buffers 201 and 202 convert, via samplers, the received line signals arriving on lines 101 and 102, respectively, to corresponding input sequences. The buffers also incorporate equalizers, prior to the samplers, to account for the propagation characteristics of each of the pairs which induce interfering components in the sequences. The sequences emitted from the samplers are then amplified using different receiver gains for lines 101 and 102. The outputs of the receive buffers, appearing on leads 207 and 208, respectively, both serve as inputs to combiners 203 and 205. Data sink 204, coupled to combiner 203, receives the data sequence propagating on lead 209 from combiner 203; this data sequence corresponds to an estimate of the data sequence originated by source 103 of transmitter 100. Similarly, data sink 206, coupled to combiner 205, receives the data sequence propagating on lead 210 from combiner 205; this data sequence corresponds to an estimate of the data sequence originated by source 104.

In mathematical terms, as presented in detail below, receiver 200 forms an inner product between the noise corrupted, received signal arriving on pairs 101 and 102, and a fixed two-dimensional receiver vector with components equal to the gains provided by receive buffers 201 and 202. In one exemplary case, namely, if the noise on the two cable pairs is uncorrelated, to achieve the maximum signal-to-noise ratio at the output of combiners 203 and 205, the gain vector is proportional to the received signal vector. However, since there is a reasonable possibility that the noise on the two constituent pairs is correlated, this eventuality must also be considered in the most general case; this general case is treated in the section below. As an example of this situation, if the only noise on the two pairs was due to pair-to-pair coupling, such as near-end crosstalk (NEXT) to the same signal source, the sampled noise on the two pairs would be perfectly correlated. (The effects of NEXT and FEXT (far-end crosstalk), to be discussed shortly, on wire cable pairs are well-known from the literature; for instance, reference may be made to the article entitled "Broad Signal Constraints for Management of the Spectrum in Telephone Loop Cables," by J. W. Lechleider, published in the *IEEE Transactions on Communications*, Vol. Com-34, No. 7, July, 1986.)

Function Theoretic Basis

The theory of coordinated transmission, as now outlined, determines the best way to use two pairs with unequal transmission gains and with sampled noise at the two receivers correlated; the best way is to choose the receiver vectors in proportion to the eigenvectors, $\theta_i$, of the following eigenvalue problem:

$$CC^+ \theta_i = \kappa_i N \theta_i \tag{1}$$

where C is the channel matrix after the elimination of both intersymbol interference (ISI) and far-end crosstalk (FEXT) (usually negligible) between the constituent pairs of the system. (The $^+$ indicates the transpose of the quantity to which it is affixed.) (The concept of ISI and how to correct for this deleterious effect are well-known in the literature; for instance, reference may be made to Chapter 5, Volume 1, of the two-volume text set entitled *Digital Transmissions Systems and Networks*, by M. J. Miller and S. V. Ahamed, published by Computer Science Press in 1987.) This C matrix is diagonal (matrix or vector quantities are shown in boldface):

$$C = \begin{bmatrix} c_1 & 0 \\ 0 & c_2 \end{bmatrix} \tag{2}$$

The matrix N is used to designate the covariance matrix of the noise on the two pairs. If the mean-square sampled noise on the $i^{th}$ pair is $\sigma_i^2$ and the correlation coefficient between the noise samples on the two pairs is k, then N is a $2 \times 2$ matrix given by $$N = \begin{bmatrix} \sigma_1^2 & k\sigma_1\sigma_2 \\ k\sigma_1\sigma_2 & \sigma_2^2 \end{bmatrix} \tag{3}$$

Thus the matrix N has elements $N_{11} = \sigma_1^2$, $N_{12} = k\sigma_1\sigma_2$, $N_{21} = N_{12}$, and $N_{22} = \sigma_2^2$; moreover, $N_1$ is a vector with components $N_{11}$, $N_{12}$, and $N_2$ has components $N_{21}$, $N_{22}$.

The eigenvalues, $\kappa_i$, are the signal-to-noise ratios at the inputs to data sinks 204 and 206 in FIG. 2.

The following data provide an indication in a working environment of the relative magnitude of the values in equations (1)–(3). Typically, the ratio of $C_1$ to $C_2$ is approximately $\sqrt{2}$; in addition, the ratio of $\sigma_1$ to $\sigma_2$ is about 3; finally, $\kappa = 0.5$.

One of the eigenvalues from equation (1) corresponds to the maximum possible signal-to-noise ratio; the other eigenvalue is the minimum value that can be achieved. For the above data, $\kappa_1$ and $\kappa_2$ may be expressed in terms of $C_2$ and $\sigma_2$ as follows:

$$\kappa_1 = 1.42114 \frac{C_2^2}{\sigma_2^2}, \text{ and } \kappa_2 = 0.20489 \frac{C_2^2}{\sigma_2^2}.$$

These values may be used to solve for the eigenvectors corresponding to the above data. Generally, the eigenvector $\theta_1$ has components $\theta_{11}$ and $\theta_{12}$ and $\theta_2$ has components $\theta_{21}$ and $\theta_{22}$. For the given data, $\theta_{12} = -5.06178 \theta_{11}$ and $\theta_{22} = 0.39512 \theta_{21}$.

Since the receiver vectors are proportional to the eigenvectors from equation (1), they may be represented by $$R_i = m_i \theta_i \tag{4}$$

where $m_i$ is the root mean square (r.m.s.) noise at the input to data sinks 204 and 206, for $i = 1$ and 2, respectively; $m_i$ is given by $$\delta_{ij} m_i^2 = R_1^+ N R_j \tag{5}$$

where $\delta_{ij}$ is a kronecker delta. The corresponding signal vectors that optimize the received signals are given by $$S_i = \frac{C^+ \theta_i}{m_i \kappa_i}. \tag{6}$$

Because of the properties of the matrices C and N, the received signal vectors, $\{C\ S_i\}$ and the receiver vectors, $\{R_j\}$, form bi-orthogonal families in the sense that $$R_j^+ C S_i = \delta_{ij}. \tag{7}$$

Figure 3:
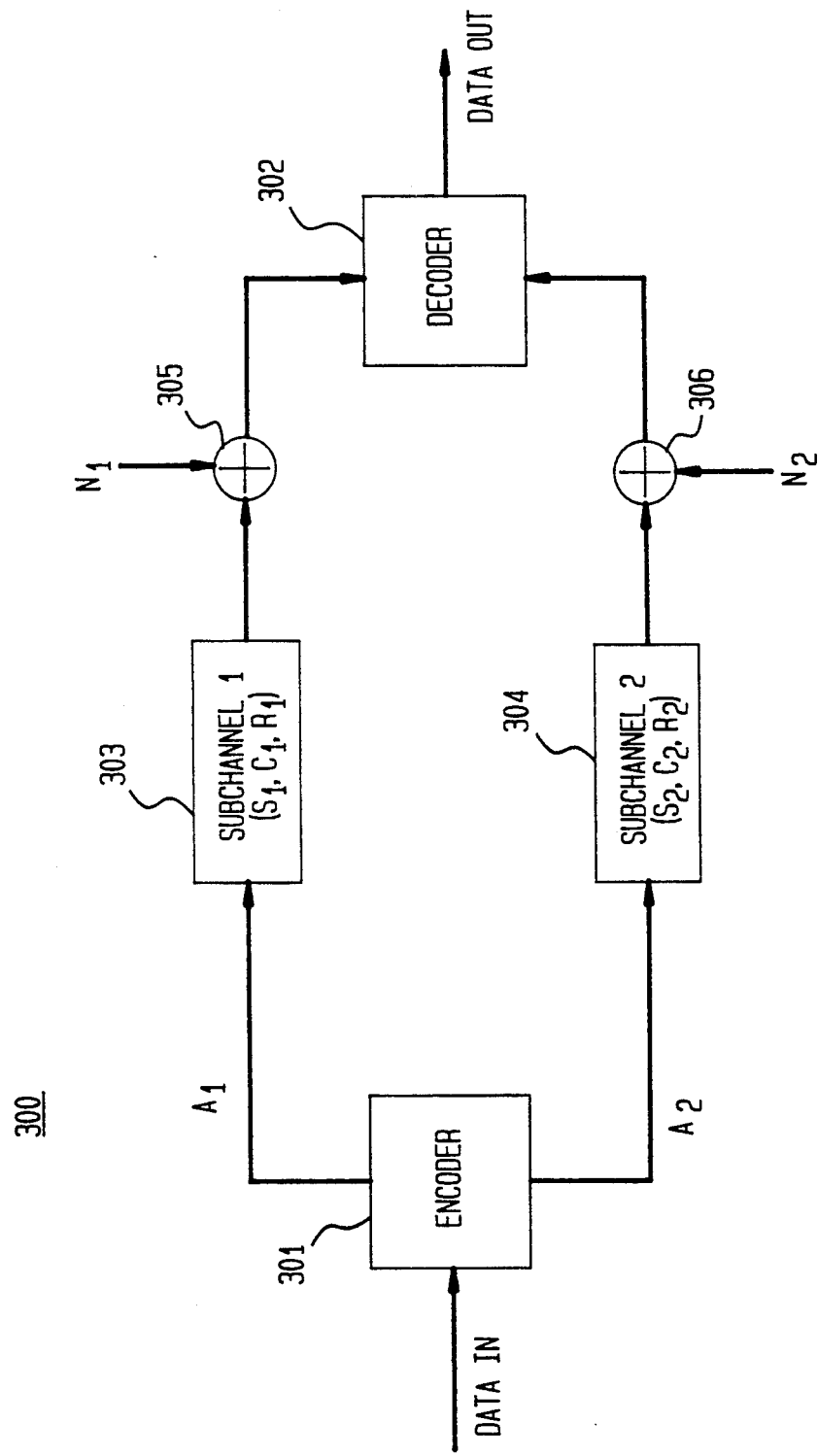
FIG. 3 is a block diagram of a transmission system depicting two logical subchannels derived from two physical cable pairs.

It should be noted that equation (6) implies that the received signal and receiver vector pairs $(S_1, R_1)$ and $(S_2, R_2)$ can be used simultaneously without coupling between them. Thus, each of the transmitter/receiver pairs creates an isolated subchannel on the two pairs; this is illustrated in conceptual block diagram form by block diagram 300 of FIG. 3. As FIG. 3 depicts, generalized encoder 301 and decoder 302 are coupled by independent subchannels 303 and 304. The subchannels are characterized, in signal theory terms, by the quantities (S, C, and R). Moreover, additive noise vectors with components $N_1$ and $N_2$, characterized by the correlation matrix N, are introduced into the subchannels of system 300 through adders 305 and 306.

The total transmitted signal vector is a linear combination of the signal vectors corresponding to the two eigenvectors of equation (1). Thus, the total two-dimensional signal vector is $$S = A_1 S_1 + A_2 S_2 \tag{8}$$

where the $A_i$'s are modulation coefficients modulating the actual signal, such as a pulse train, propagating on pairs 101 and 102; these coefficients are identified in FIG. 3 as emanating from encoder 301.

An Ilustrative Transmitter for Coordinated Transmission

Figure 4:
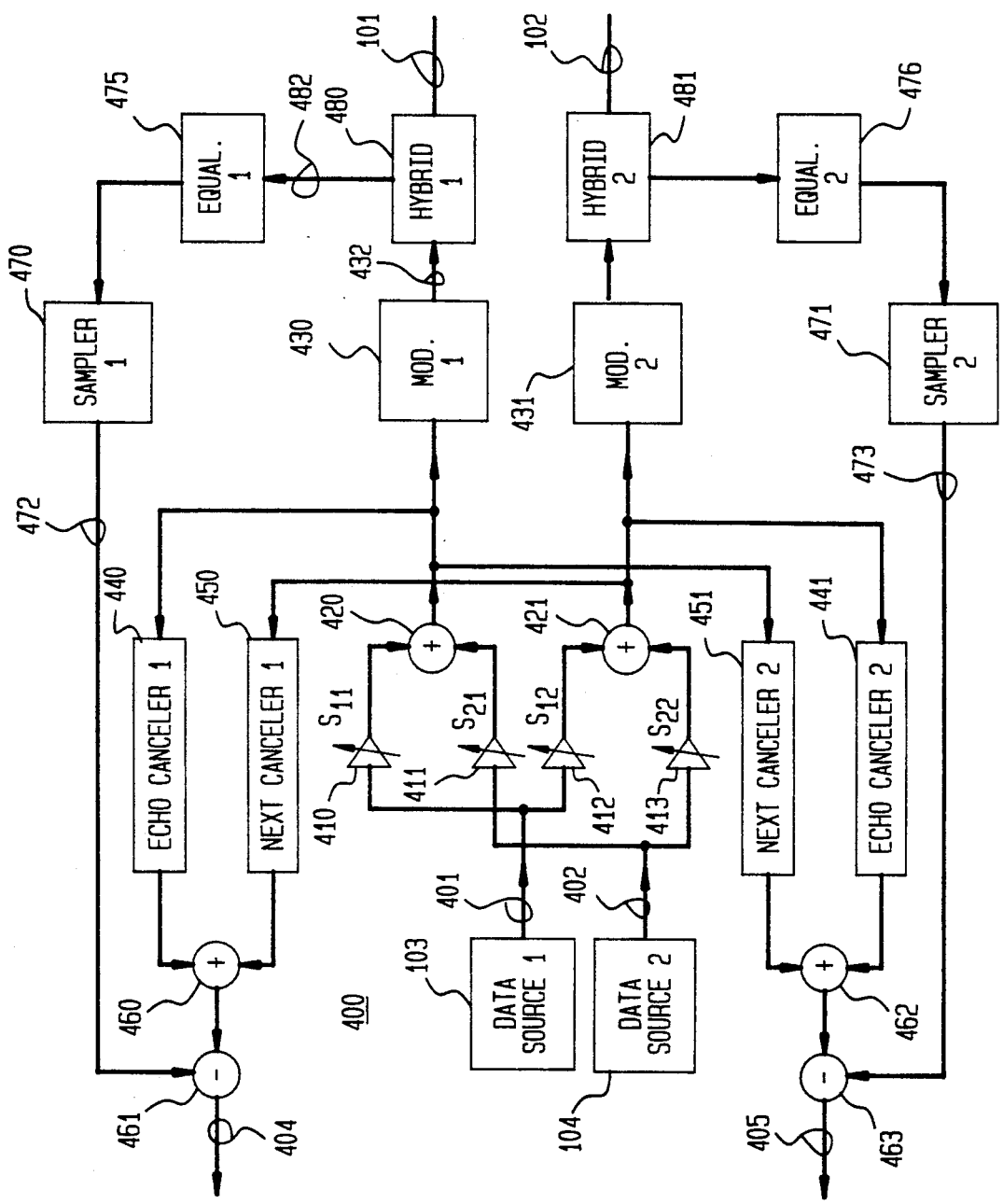
FIG. 4 is a block diagram illustrative of one embodiment of the transmitter of FIG. 1.

Transmitter 100 of FIG. 1, which depicted in high-level block diagram form a transmitter for use in a coordinated transmission system, is now illustrated in more detail in FIG. 4.

With reference to FIG. 4, each of the data sequences emitted from data sources 103 and 104, on leads 401 and 402, respectively, is split for propagation over the two pairs that constitute the coordinated subchannels; for instance, data source 103 serves as an input to both amplifiers 410 and 412 which have outputs destined for lines 101 and 102, respectively. The amplifier gains of amplifiers 410–413 are shown as variable because they must be set in accordance with the initialization and monitoring procedure to be presented below. The upper data sequence is amplified by $S_{11}$ and the lower sequence by $S_{21}$ before being added together in upper combiner 420. $S_{11}$ is the first entry in the vector quantity $S_1$; also, $S_{21}$ is the first entry in the vector quantity $S_2$. The output of combiner 420 modulates a line carrier signal, such as a periodic pulse stream, generated by modulator 430; in turn, modulator 430 drives hybrid 480 which couples the modulated line signal onto line 101. The coupling property of a hybrid arrangement is well-known in the art, namely, a hybrid serves to interface two unidirectional signals (transmit on lead 432 and receive on lead 482) to a bidirectional path (line 101). The hybrid is generally not considered to be a component of the transmitter, but rather as a necessary coupling element for transmission systems of the type exploited by the present invention. Moreover, modulator 430 is also standard in the art.

Figure 6:
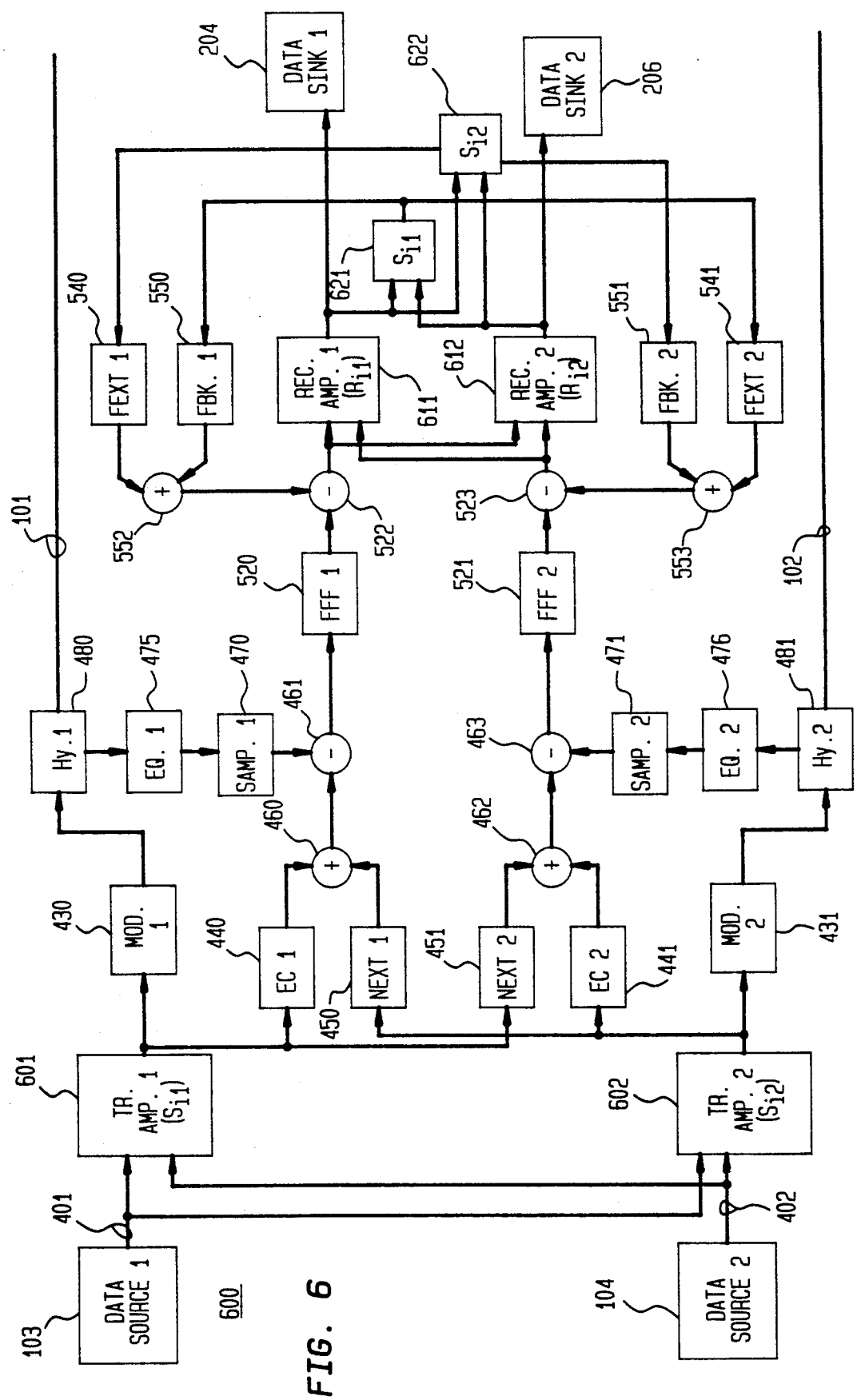
FIG. 6 is a block diagram of an embodiment of a transceiver, that is, the combination of the block diagrams of FIGS. 4 and 5.

The output of combiner 420 is also used to drive echo canceler 440 that subtracts an approximate replica of the echo on line 101 from the input to the receiver for that line (the specifics will be covered in more detail when FIG. 6 is presented). The signal to be processed by the receiver from line 101 is delivered by lead 472 from the cascade combination of hybrid 480, equalizer 475, and sampler 470. The arrangement of such equalizers, which are well-known in the art, is presumed to include antialiasing filters and fixed equalization based on the parameters of wire pairs 101 and 102, such as length and gauge. Equalizer 475, for example, may compensate for gross characteristics on line 101, such as the $\sqrt{f}$ loss characteristic, and may effect band limitation. Sampler 470 converts the line carrier signal (propagated by a complementary far-end transmitter) transmitted on line 101 to a received input sequence. The echo signal from canceler 440 is first applied to adder 460, and the subtraction from the received input sequence on lead 472 is accomplished by subtractor 461. One way that the echo canceler can be realized is as a tapped delay line with the tap weights set equal to the sampled values of the echo path unit pulse response on line 101 (see, for instance, the two-volume text by Miller et al referenced above on designing an echo canceler from measured pulse response.) However, other implementations known to those with ordinary skill in the art are also possible.

The output of upper combiner 420 also drives NEXT canceler 451. The output of NEXT canceler 451 combines with the input to the receiver on line 102, via adder 462 and subtractor 463. NEXT canceler 451 may also be implemented as a tapped delay line. The tap weights are set equal to the samples of the unit pulse response for the NEXT path from line 101 to line 102. NEXT pulse responses are usually very short lived, so that NEXT 451 canceler requires only a few taps.

What was described above for the upper section involving upper combiner 420 may be repeated for the lower section, making changes to the corresponding reference numerals where appropriate. For instance, amplifier 412 has a gain of $S_{12}$ and amplifier 413 has a gain factor of $S_{22}$; $S_{12}$ and $S_{22}$ are the second entries in the vector quantities $S_1$ and $S_2$, respectively.

It should be emphasized that the combination of the two echo cancelers and the two NEXT cancelers constitutes a two-dimensional generalization of a conventional echo canceler. This combination of cancelers is driven by the two-dimensional vector that is transmitted on the two pairs and it subtracts a sequence of two-dimensional sampled responses from the input to the two-pair receiver. This combination may therefore be considered as a matrix echo canceler. The matrix canceler may be treated as a vector tapped delay line. The signal being filtered by the tapped delay line is a sequence of two-dimensional vectors. The taps in the vector delay line are two-by-two networks. The tap weights are matrices. The diagonal elements of these tap matrices are the sampled values of the conventional single line echoes. The off-diagonal elements are the sampled values of the NEXT unit pulse responses.

An Illustrative Receiver for Coordinated Transmission

Figure 5:
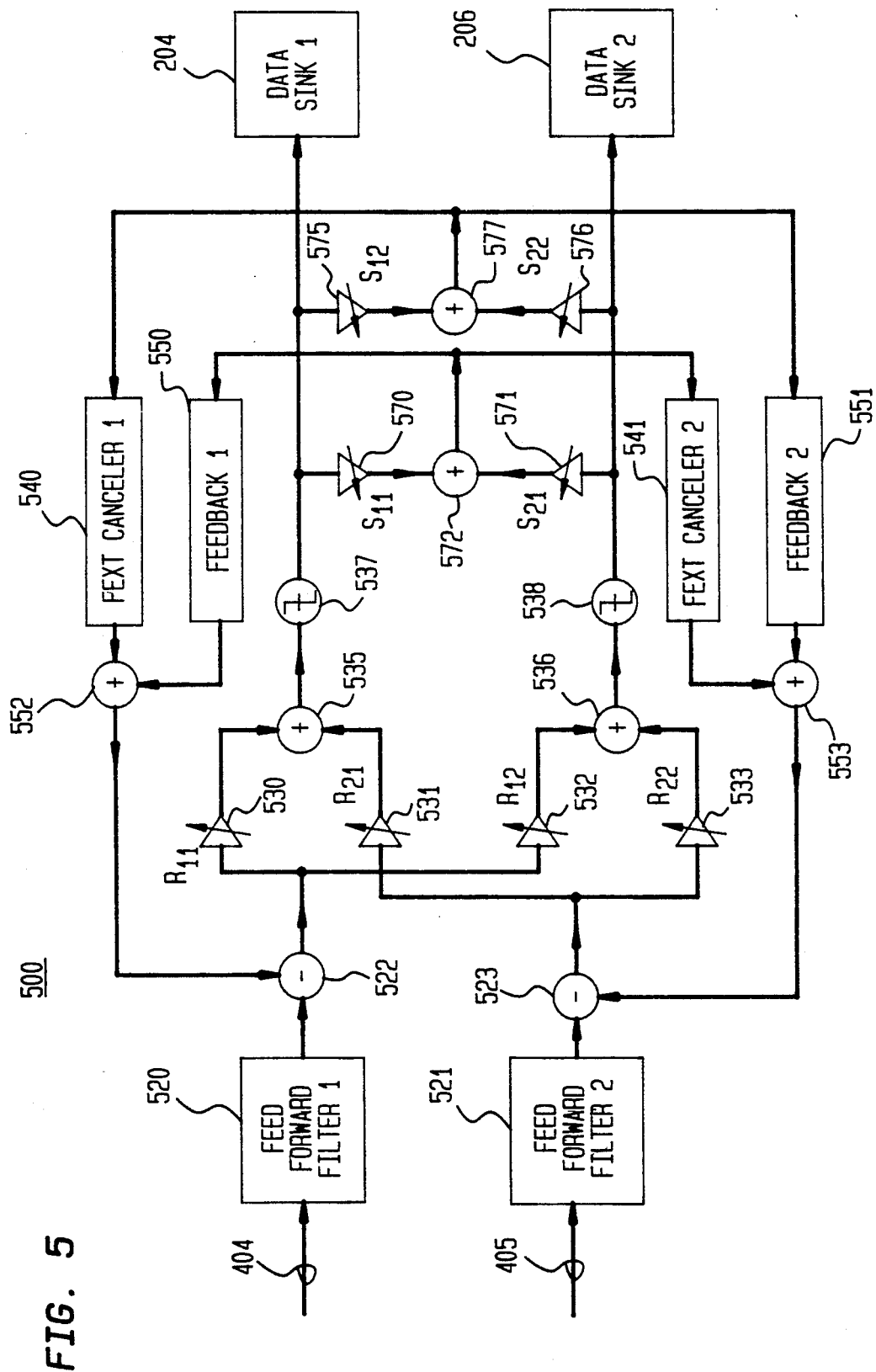
FIG. 5 is a block diagram illustrative of one embodiment of the receiver of FIG. 2.

An exemplary receiver 500 for coordinated transmission is illustrated in FIG. 5, which is a detailed counterpart to FIG. 2. This receiver is a two-dimensional generalization of a decision feedback equalizer (DFE). The principle of operation of a DFE is well-known in the art; for instance, reference is made to Chapter 6 of the text entitled *Digital Communications*, by J. G. Proakis, published by McGraw-Hill, 1983. For the sake of the following discussion, it is important to note that a DFE is composed of two parts, namely, a feed forward filter (FFF) section and a feedback (FEEDBACK) section. A FFF section generally compensates for pre-cursor ISI and noise, whereas a FEEDBACK section is arranged to compensate for post-cursor ISI (see "Digital Subscriber Line Terminals for Use with Correlated Line Codes," by J. W. Lechleider, in *IEEE Transactions on Communications*, Vol. COM-35, No. 10, October, 1987 which is incorporated herein by reference). Either section may be realized as a tapped delay line.

In FIG. 5, it is shown that each input 404 and 405 is coupled to the receiver 500 by feed forward filters (FFF) 520 and 521, respectively. Feed forward filter 520 is one portion of the DFE for the upper receiver section. The received sequence on each line 404 or 405 is a sampled version of the received line signal appearing on each line 101 or 102 at the input to receiver 500 (these samplers are shown by elements 470 and 471 of FIG. 4).

With reference to the upper receiver section of FIG. 5, the compensated sequence from filter 520 feeds subtractor 522; the other input to subtractor 522 is supplied by adder 552, as discussed shortly. The output of subtractor 522 serves as the input to receiver amplifier 530; this amplifier has a gain factor equal to $R_{11}$. The output from subtractor 523 in the lower receiver section serves as an input to amplifier 531, and this amplifier has a gain designated $R_{21}$. $R_{11}$ is the first entry in the vector quantity $R_1$; also, $R_{21}$ is the first entry in the vector quantity $R_2$. The output amplified sequences of amplifiers 530 and 531 are combined in adder 535 to produce a composite sequence, which then serves as the input to slicer 537. Slicer 537 emits an output indicative of the received level of the each data element in the arriving data sequence. The output sequence of slicer 537, which is coupled to data sink 204, is the desired received sequence; this received sequence is an estimate to the actual data sequence transmitted by the first data source in the transmitter. The output of slicer 537 also serves as an input to amplifiers 570 and 575 having gains of $S_{11}$ and $S_{12}$, respectively. Slicer 538 in the lower receiver section provides the second received sequence which is an estimate of the actual data sequence transmitted by the second data source in the transmitter. In addition, the output of slicer 538 is an input to amplifiers 571 and 576 having gains of $S_{21}$ and $S_{22}$, respectively. Amplifiers 570 and 571 produce corresponding amplified sequences which feed adder 572, and the output control sequence from adder 572 couples to the input of feedback filter 550 in the upper section and FEXT canceler 541 in the lower section. Similarly, amplifiers 575 and 576 feed sequences to adder 577, and the output control sequence from adder 577 couples to the input of FEXT canceler 540 in the upper section and feedback filter 551 in the lower section. Feedback filters 550 and 551 are the feedback filters of the upper and lower DFEs, respectively.

The output feedback sequences from FEXT canceler 540 and feedback filter 550 are combined in adder 552 and, as alluded to earlier, the output of adder 552 serves as a second input to subtractor 522. Thus an approximate negative replica of the sampled post-cursor intersymbol interference of the previously detected symbols is supplied by feedback filter 550 to cancel the post-cursor effects. The FEXT between pairs 101 and 102 is canceled in a manner similar to the way NEXT was canceled in FIG. 4. It is to be noted that the introduction of FEXT cancellation converts a conventional DFE to a two-dimensional DFE, just as NEXT cancellation converts the echo canceler to a two-dimensional echo canceler. In a similar manner, the lower receiver section provides for feedback sequences to correct for post-cursor interference and FEXT coupling.

The input to data sink 204 is $\hat{A}_1$ and, when no noise is present, that estimate to the input symbol $A_1$ is in the form:

$$\hat{A}_1 = R_{11}C_1[A_1S_{11} + A_2S_{12}] + R_{21}C_2[A_1S_{21} + A_2S_{22}] \quad (9)$$

From the orthogonality relation (8), it follows that $$\hat{A}_1 = A_1 \quad (10)$$

because $$R_{11}C_1S_{11} + R_{21}C_2S_{21} = 1$$

$$R_{11}C_1S_{12} + R_{21}C_2S_{22} = 0 \quad (11).$$

Similar results obtain for the lower receiver section. Thus, receiver 500 detects the correct output in the absence of noise and with perfect adaptation of the equalizers and the feed forward and feedback filters.

An Illustrative Transceiver for Coordinated Transmission

In order to communicate in a dual duplex mode over the two wire pairs composing the coordinated subchannels, it is necessary to provide an integrated transmitter and receiver at each end of the wire pairs. Such an arrangement is depicted in FIG. 6 wherein transmitter 400 of FIG. 4 and receiver 500 of FIG. 5 have been combined to form a so-called "transceiver", that is, element 600 of FIG. 6. In a telephony environment, one transceiver is located in a telephone central office (CO) at the near end of the cable pairs, and complementary transceiver is located in a remote terminal at the far end of two cable pairs, thereby allowing four independent data sources to communicate over the coordinated transmission system in accordance with the present invention. For sake of clarity, elements from FIG. 4 that are shown in FIG. 6 are labeled with the reference numerals used in FIG. 4; similiarly, elements from FIG. 5 shown in FIG. 6 use like reference numerals. Some elements from FIG. 4 have been grouped together for FIG. 6. For instance, element 601 of FIG. 6 represents the combination of amplifiers 410 and 411 as well as combiner 420 of FIG. 4; similarly, element 602 is the combination of amplifiers 412 and 413 as well as combiner 421. Element 611 of FIG. 6 is the combination of amplifiers 530 and 531, combiner 535, and slicer 537 of FIG. 5; similarly, element 612 is the combination of amplifiers 532 and 533, combiner 536, and slicer 538.

Finally, element 621 represents amplifiers 570 and 571 and adder 572; similarly, element 622 is the combination of amplifiers 575 and 576 and adder 577. The operation of the integrated arrangement of FIG. 6 conforms to the operation of the various subcomponents as discussed in the foregoing.

Figure 7:
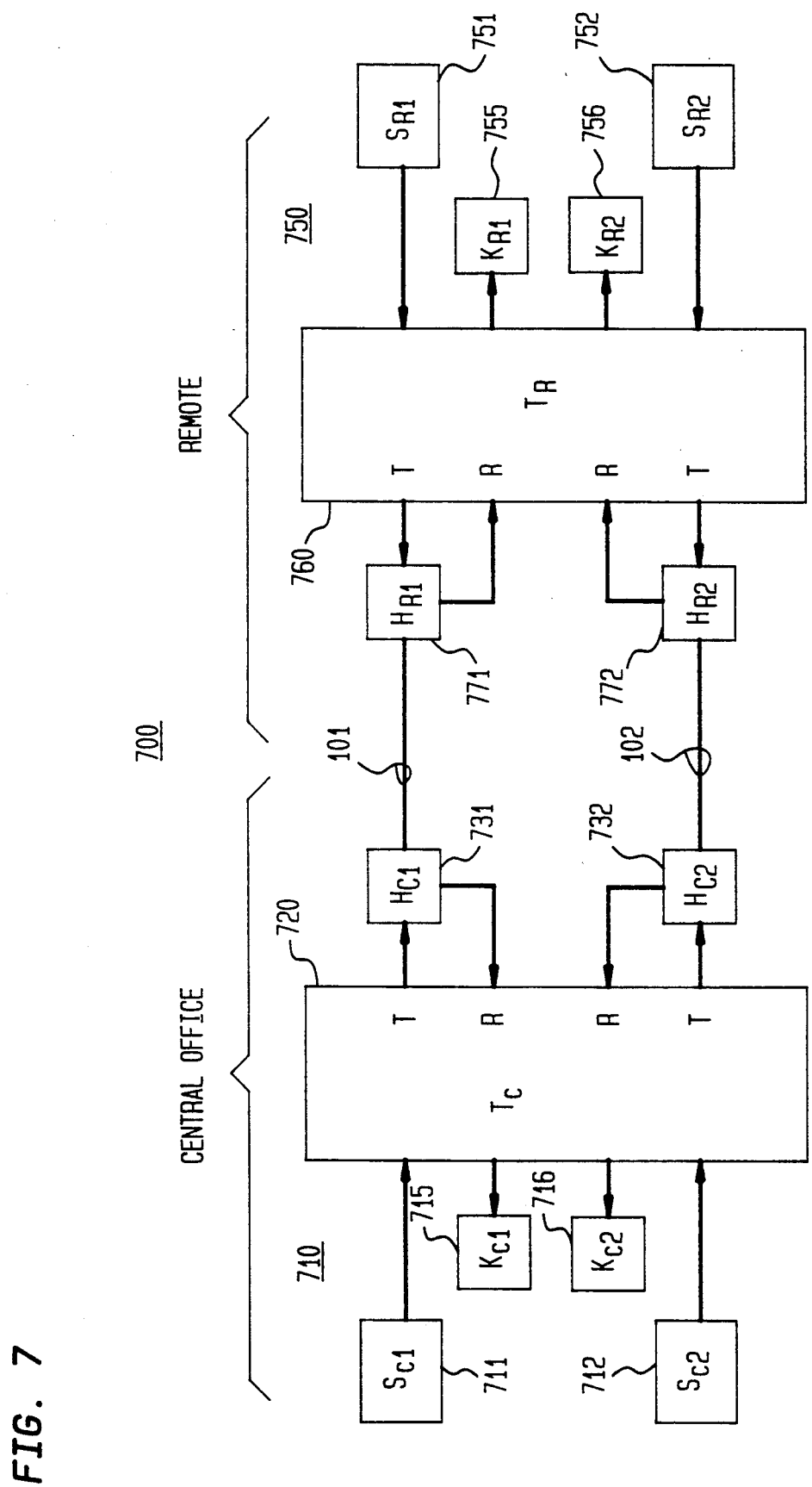
FIG. 7 is a block diagram of a complete full duplex communication system depicting the interconnection of a central office transceiver, a remote transceiver, and four independent data sources and data sinks to two transmission line pairs via hybrids.

As suggested in the preceding paragraph, a complete digital communication system includes transceivers terminating both ends of the transmission lines. Block diagram 700 of FIG. 7 is a high-level block diagram illustrative of a total communication system between CO location 710 and remote location 750 incorporating CO transceiver 720 ($T_C$) and remote transceiver 760 ($T_R$) connected to wire pairs 101 and 102 via an interposed CO hybrid pair 731,732 ($H_{C1}$, $H_{C2}$) and an interposed remote hybrid pair 771,772 ($H_{R1}$, $H_{R2}$), respectively. System 700 supports full duplex communication between pairs of data sources and data sinks, namely: (a) data sources 711 and 751 ($S_{C1}$ and $S_{R1}$) and data sinks 715 and 755 ($K_{C1}$ and $K_{R1}$); and (b) data sources 712 and 752 ($S_{C2}$ and $S_{R2}$) and data sinks 716 and 756 ($K_{C2}$ and $K_{R2}$).

Adaptation Protocols

In this section, the procedures are presented that will adapt the coordinated transmission from startup and keep it tracking while the transmission environment changes. First, the startup procedure is:

A. Initialization

1. Initial settings for both transceivers 720 and 760:

$S_{11} = S_{22} = R_{11} = R_{22} = 1$ $S_{12} = S_{21} = R_{12} = R_{21} = 0$

Echo canceler taps equal to zero.
   NEXT canceler taps equal to zero.
   Equalizer main cursor tap to 1; all other taps to zero.
   FFF main cursor tap to 1; all other taps to zero.
   FEEDBACK canceler taps equal to zero.
   FEXT canceler taps equal to zero.

2. Transmit a unit pulse train from, say, data source 711 of CO transceiver 720 to remote transceiver 760 at time intervals in excess of the expected transient decay time of all circuitry. During this transmission, echo canceler 440 at the CO location is tuned using conventional zero-forcing techniques.
   NEXT canceler 451 at the CO location is tuned using zero-forcing.
   equalizer 475, FFF 520 and FEEDBACK filter 550 are tuned at the remote location to maximize the signal-to-noise ratio at data sink 755.
   FEXT canceler 541 is tuned at the remote end.

3. Step 2 is repeated, one source at time, for the other three data sources in the system, namely, data source 712 in CO transceiver 720 and data sources 751 and 752 is remote transceiver 760.

4. Then continue as follows:
   With all data sources quiescent, sense the noise at the output of all four equalizers, that is, pairs of equalizers 475, 476.
   Determine the noise statistics at the CO transceiver and the remote transceiver for each line 101 and 102 from the noise samples.
   From the noise statistics, solve the eigenvalue problem of equation (1) for all transceivers to determine the optimum S and R matrices. This may be accomplished by completing all of the processing at the CO end using data gathered at the remote end and telemetered back to the CO.

Set amplifier gains in both CO and remote transceivers in correspondence to the solution of the eigenvalue problem, that is, the values from the S and R matrices.

System initialization is now complete.

B. On-going Adjustments

Monitoring and tracking with the system can be done as follows: At the receiver, retain slicer inputs until slicer outputs are available. Using slicer outputs, determine noiseless slicer input that would lead to the same result, given the currently estimated state of the communication system. Subtract this estimated noiseless detector input from the actual input to get the sampled slicer input noise. Use this data to continually estimate the noise statistics required as indicated in the function theoretic section. In addition, the echo cancelers, equalizers, feed forward filters, and feedback filters can track environmental changes by conventional techniques. Using the continually revised noise statistics, the optimal signal and receiver vectors can be continually updated. This can be done by continually solving the required eigenvalue problem or by using perturbation of the eigenvalue probelm to reflect small environmental changes coupled with periodic solution of the eigenvalue problem.

Revising the signal and receiver vectors will require overhead in the data stream and provision of means of adapting the transmitter to set the gains of amplifiers 410-413 of FIG. 4. However, these are relatively small requirements. Thus, tracking and adaptation of the transceiver in the face of gradual environmental changes is relatively straightforward. Of course, the required calculations will require the provision of a processor chip (not shown). However, the software required for the solution of the required eigenvalue problems is simpler than that required for the continual adaptation of a conventional DFE.

It is to be understood that the above-identified arrangements are simply illustrative of the application of the principles in accordance with the present invention. Other arrangements may be readily devised by those of ordinary skill in the art which embody the principles of the present invention and fall within its spirit and scope.

What is claimed is:

1. A transmitter for propagating first and second data sequences originated by first and second data sources, respectively, over first and second transmission lines, the lines being coupled to the transmitter by first and second hybrid arrangements each having transmit and receive ports, and wherein the receive ports of the first and second hybrid arrangements provide first and second sampled input sequences, respectively, each having echo and NEXT interfering components, the transmitter including modulation means for generating first and second line carrier signals, the transmitter comprising line buffer means, coupled to the first and second data sources, for generating a first composite sequence and a second composite sequence, said first composite sequence being formed from a combination of separately amplified ones of the first and second data sequences, and said second composite sequence being formed from another combination of separately amplified ones of the first and second data sequences; for modulating the first line carrier signal with said first composite sequence to produce a first modulation signal; for modulating the second line carrier signal with said second composite sequence to produce a second modulation signal; for supplying said first modulation signal to the transmit port of the first hybrid arrangement; and for supplying said second modulation signal to the transmit port of the second hybrid arrangement, and canceler means, coupled to said line buffer means and the receive ports of each of the hybrid arrangements and being responsive to said first and second composite sequences, for canceling the echo and NEXT components in the first and second sampled input sequences.

2. A transmitter for propagating first and second data sequences originated by first and second data sources, respectively, over first and second transmission lines, the lines being coupled to the transmitter by first and second hybrid arrangements each having transmit and receive ports, and wherein the receive ports of the first and second hybrid arrangements provide first and second sampled input sequences, respectively, each having echo and NEXT interfering components, the transmitter comprising line buffer means, coupled to the first and second data sources, for generating a first composite sequence and a second composite sequence, said first composite sequence being formed from a combination of separately amplified ones of the first and second data sequences, and said second composite sequence being formed from another combination of separately amplified ones of the first and second data sequences, modulation means, coupled to said line buffer means, for generating first and second line carrier signals; for modulating said first line carrier signal with said first composite sequence to produce a first modulation signal; for modulating said second line carrier signal with said second composite sequence to produce a second modulation signal; for supplying said first modulation signal to the transmit port of the first hybrid arrangement; and for supplying said second modulation signal to the transmit port of the second hybrid arrangement, and canceler means, coupled to said line buffer means and the receive ports of each of the hybrid arrangements and being responsive to said first and second composite sequences, for canceling the echo and NEXT components in the first and second sampled input sequences.

3. The transmitter as recited in claim 2 wherein the first and second data sequences are propagated to first and second data sinks, and further wherein amplification factors for said amplified ones of the first and second data sequences to produce said first composite sequence correspond to $S_{11}$ and $S_{21}$, respectively, with $S_{11}$ and $S_{21}$ being the first entries in the vectors $S_1$ and $S_2$, and wherein amplication factors for said amplified ones of the first and second data sequences to produce said second composite sequence correspond to $S_{12}$ and $S_{22}$, respectively, with $S_{12}$ and $S_{22}$ being the second entries in the vectors $S_1$ and $S_2$ determined from $$S_1 = \frac{C^+ \theta_1}{m_1 \kappa_1},$$

$$S_2 = \frac{C^+ \theta_2}{m_2 \kappa_2},$$

wherein C is a 2×2 channel matrix defining transmission on the first and second lines, $\kappa_1$ and $\kappa_2$ are eigenvalues to the eigenvalue problem $$CC^+\theta_i = \kappa_i N\theta_i,$$

with N being the 2×2 convariance matrix of noise on the first and second lines at the input to the first and second data sinks, respectively, and where the eigenvectors are $\theta_1$ and $\theta_2$ corresponding to $\kappa_1$ and $\kappa_2$, respectively, and $m_1$ and $m_2$ are representative of the root means square noises at the input to the first and second data sinks, respectively.

4. A transmitter for propagating first and second data sequences originated by first and second data sources, respectively, over first and second transmission lines, the lines being coupled to the transmitter by first and second hybrid arrangements each having transmit and receive ports, and wherein the receive ports of the first and second hybrid arrangements provide first and second sampled input sequences, respectively, each having echo and NEXT interfering components, the transmitter comprising first line buffer means, responsive to both the first and second data sources, for separately amplifying the first and second data sequences emitted from the corresponding data sources to produce first and second amplified sequences;

second line buffer means, responsive to both the first and second data sources, for separately amplifying the first and second data sequences emitted from the corresponding data sources to produce third and fourth amplified sequences;

first combiner means, coupled to said first line buffer means, for processing said first and said second amplified sequences to produce a first composite data sequence, second combiner means, coupled to said second line buffer means, for processing said third and said fourth amplified sequences to produce a second composite data sequence, first modulator means, responsive to said first combiner means and coupled to said first hybrid arrangement via its transmit port, for generating a first line carrier signal; for modulating said first line carrier signal with said first composite data sequence to produce a first modulated signal; and for supplying said first modulated signal to the transmit port of the first hybrid arrangement, second modulator means, responsive to said second combiner means and coupled to said second hybrid arrangement via its transmit port, for generating a second line carrier signal; for modulating said second line carrier signal with said second composite data sequence to produce a second modulated signal; and for supplying said second modulated signal to the transmit port of the second hybrid arrangement, first echo canceler means, responsive to said first composite sequence, to produce a first echo canceler sequence, second echo canceler means, responsive to said second composite sequence, to produce a second echo canceler sequence, first NEXT canceler means, responsive to said second composite sequence, to produce a first NEXT canceler sequence, second NEXT canceler means, responsive to said first composite sequence, to produce a second NEXT canceler sequence, first means for combining said first echo canceler sequence and said first NEXT canceler sequence to cancel the echo and the NEXT components in the first sampled input sequence, and second means for combining said second echo canceler sequence and said second NEXT canceler sequence to cancel the echo and the NEXT components in the second sampled input sequence.

5. The transmitter as recited in claim 4 wherein the first and second data sequences are propagated to first and second data sinks, and further wherein said first line buffer means includes amplifiers with amplification factors $S_{11}$ and $S_{21}$ to generate said first and second amplified sequences, respectively, with $S_{11}$ and $S_{21}$ the first entries in the vectors $S_1$ and $S_2$, wherein said second line buffer means includes amplifiers with amplification factors $S_{12}$ and $S_{22}$ to generate said third and fourth amplified sequences, respectively, with $S_{12}$ and $S_{22}$ being the second entries in the vectors $S_1$ and $S_2$ determined from $$S_1 = \frac{C^+\theta_1}{m_1\kappa_1},$$

$$S_2 = \frac{C^+\theta_2}{m_2\kappa_2},$$

wherein C is a 2×2 channel matrix defining transmission on the first and second lines, $\kappa_1$ and $\kappa_2$ are eigenvalues to the eigenvalue problem $$CC^+\theta_i = \kappa_i N\theta_i,$$

with N being the 2×2 covariance matrix of noise on the first and second lines at the input to the first and second data sinks, respectively, and where the eigenvectors are $\theta_1$ and $\theta_2$ corresponding to $\kappa_1$ and $\kappa_2$, respectively, and $m_1$ and $m_2$ are representative of the root mean square noises at the input to the first and second data sinks, respectively.

6. The transmitter as recited in claim 5 wherein said $S_{11}$, $S_{12}$, $S_{21}$, and $S_{22}$ amplification factors are adjustable in accordance with the periodic solutions to said eigenvalue problem caused by variations in said noise components of said covariance matrix.

7. A receiver for detecting first and second line signals propagated by first and second transmission lines to produce first and second received data sequences, the lines being coupled to the receiver by first and second hybrids each having transmit and receive ports, wherein the first and second line signals are emitted by the respective receive ports of the first and second hybrids, each of the line signals having FEXT, pre-cursor and post-cursor intersymbol interfering components, the receiver comprising receive buffer means, coupled to the receive ports of the hybrids, for separately sampling, equalizing, and feed forward filtering the first and second line signals to produce first and second compensated sequences, combiner means, coupled to said receive buffer means, for generating a first combined sequence and a second combined sequence, said first combined sequence being formed from a combination of separately amplified versions of said first and second compensated sequences, and for processing said first combined sequence by threshold detecting each of the elements of said first combined sequence to produce the first received data sequence; said second combined sequence being formed from another combination of separately amplified versions of said first and second compensated sequences, and for processing said second combined sequence by threshold detecting each of the elements of said second combined sequence to produce the second received data sequence, and canceler means, coupled to said receive buffer means and said combiner means and being responsive to the first and second received data sequences, for canceling the FEXT, pre-cursor and post-cursor interfering components in said first and second compensated sequences.

8. A receiver for detecting first and second line signals propagated by first and second transmission line pairs to produce first and second received data sequences, the pairs being coupled to the receiver by first and second hybrids each having transmit and receive ports, wherein the first and second line signals are emitted by the respective receive ports of the first and second hybrids, each of the line signal having FEXT, pre-cursor and post-cursor interfering components, the receiver comprising first receive buffer means, coupled to the receive port of the first hybrid, for equalizing and for sampling the first line signal to produce a first input sequence, second receive buffer means, coupled to the receive port of the second hybrid, for equalizing and for sampling the second line signal to produce a second input sequence, a first feed forward filter, coupled to said first receive buffer means, to compensate for noise and pre-cursor interference and to produce a first compensated sequence corresponding to said first input sequence, a second feed forward filter, coupled to said second receive buffer means, to compensate for noise and pre-cursor interference and to produce a second compensated sequence corresponding to said second input sequence, first subtractor having said first compensated sequence as one input, second subtractor having said second compensated sequence as one input, first amplifier means, coupled to said first substractor and said second subtractor, for separately amplifying the output of said first subtractor and the output of said second subtractor, to produce first and second amplified sequences, second amplifier means, coupled to said first subtractor and said second subtractor, for separately amplifying the output of said first subtractor and the output of said second subtractor, to produce third and fourth amplified sequences, first means for combining said first and second amplified sequences to produce a first combined sequence, second means for combining said third and fourth amplified sequences to produce a second combined sequence, first slicer means, coupled to said first means for combining, for generating the first received sequence from said first combined sequence, second slicer means, coupled to said second means for combining, for generating the second received sequence from said second combined sequence, third amplifier means, coupled to said first and second slicers, for separately amplifying the first and second received sequences, respectively, to produce fifth and sixth amplified sequences, fourth amplifier means, coupled to said first and second slicers, for separately amplifying the first and second received sequences, respectively, to produce seventh and eighth amplified sequences, third means for combining said fifth and sixth amplified sequences to produce a first control sequence, fourth means for combining said fifth and sixth amplified sequences to produce a second control sequence, first feedback filter means, responsive to said first control sequence, to compensate for the post-cursor intersymbol interference of previous elements of the first received sequence and to produce a first feedback sequence, second feedback filter means, responsive to said second control sequence, to compensate for the post-cursor intersymbol interference of previous elements of the second receiver sequence and to produce a second feedback sequence, first FEXT canceler means, responsive to said second control sequence, to produce a third feedback sequence, second FEXT canceler means, responsive to said first control sequence, to produce a fourth feedback sequence, fifth means for combining said first feedback sequence and said third feedback sequence to produce a first subtraction sequence serving as a second input to said first subtractor, and sixth means for combining said second feedback sequence and said fourth feedback sequence to produce a second subtraction sequence serving as a second input to said second subtractor.

9. The receiver as recited in claim 8 wherein said first amplifier means includes amplifiers with amplification factors $R_{11}$ and $R_{21}$ to produce said first and second amplified sequences, said second amplifier means includes amplifiers with amplification factors $R_{12}$ and $R_{22}$ to produce said third and fourth amplified sequences, said third amplifier means includes amplifiers with amplification factors $S_{11}$ and $S_{21}$ to produce said fifth and sixth amplified sequences, and said fourth amplifier means includes amplifiers with amplification factors $S_{12}$ and $S_{22}$ to produce said seventh and eighth amplified sequences, wherein $R_{11}$ and $R_{12}$ form a vector $R_1$; $R_{21}$ and $R_{22}$ form a vector $R_2$, wherein $S_{11}$ and $S_{12}$ form a vector $S_1$; $S_{21}$ and $S_{22}$ form a vector $S_2$, with $$S_1 = \frac{c^+ \theta_1}{m_1 \kappa_1},$$

$$S_2 = \frac{c^+ \theta_2}{m_2 \kappa_2},$$

$$R_1 = m_1 \theta_1,$$
$$R_2 = m_2 \theta_2$$

wherein C is a 2×2 channel matrix defining transmission on the first and second lines, $\kappa_1$ and $\kappa_2$ are eigenvalues to the eigenvalue problem $$CC^+\theta_i = \kappa_i N\theta_i,$$

with N being the 2×2 covariance matrix of noise in the first and second received data sequences, respectively, and where the eigenvectors are $\theta_1$ and $\theta_2$ corresponding to $\kappa_1$ and $\kappa_2$, respectively, and $m_1$ and $m_2$ are representative of the root mean square noises in the first and second received data sequences, respectively.

10. The receiver as recited in claim 9 wherein said $R_{11}$, $R_{12}$, $R_{21}$, and $R_{22}$ amplification factors as well as said $S_{11}$, $S_{12}$, $S_{21}$, and $S_{22}$ amplification factors are all adjustable in accordance with the periodic solutions to said eigenvalue problem caused by variations in said noise components of said covariance matrix.

11. A transceiver for transceiving first and second data sequences originated by first and second data sources, respectively, over first and second transmission lines, the lines being coupled to the transceiver by first and second hybrids each having transmit and receive ports, and wherein the receive ports of the first and second hybrids provide first and second received line signals, respectively, each having echo, noise, line distortion, NEXT, and FEXT interfering components, the transceiver comprising line buffer means, coupled to the first and second data sources, for generating a first composite sequence and a second composite sequence, said first composite sequence being formed from a combination of separately amplified versions of the first and second data sequences, and said second composite sequence being formed from another combination of separately amplified versions of the first and second data sequences, modulation means, coupled to said line buffer means, for generating first and second line carrier signals; for modulating said first line carrier signal with said first composite sequence to produce a first modulation signal and for modulating said second line carrier signal with said second composite sequence to produce a second modulation signal; for supplying said first modulation signal to the transmit port of the first hybrid and for supplying said second modulation signal to the transmit port of the second hybrid, receive buffer means, coupled to the receive ports of the hybrids, for equalizing the first and second received line signals to produce first and second equalized received line signals, and for separately sampling said equalized first and second received line signals to produce first and second sampled line sequences, first canceler means, coupled to said line buffer means and the receive buffer means and being responsive to said first and second composite sequences, for canceling the echo and NEXT components in the first and second sampled line sequences to produce first and second input sequences, feed forward filter means for filtering the noise and the line distortion in said first and second input sequences to produce first and second compensated sequences, combiner means, coupled to said feed forward filter means, for generating a first combined sequence and a second combined sequence, said first combined sequence being formed from a combination of separately amplified versions of said first and second compensated sequences and for processing the first combined sequence by threshold detecting each of the elements of the first combined sequence to produce a first received data sequence; and said second combined sequence being formed from another combination of separately amplified versions of said first and second compensated sequences and for processing the second combined sequence by threshold detecting each of the elements of the second combined sequence to produce a second received data sequence, and second canceler means, coupled to said feed forward filter means and said combiner means and being responsive to said first and second received data sequences, for canceling the FEXT interfering components and post-cursor intersymbol interfering components in said first and second received sequences processed by the transceiver.

12. The transceiver as recited in claim 11 wherein the first and second data sequences are propagated to first and second data sinks, and further wherein amplification factors for said amplified ones of the first and second data sequences to produce said first composite sequence correspond to $S_{11}$ and $S_{21}$, respectively, with $S_{11}$ and $S_{21}$ being the first entries in the vectors $S_1$ and $S_2$, and wherein amplification factors for said amplified ones of the first and second data sequences to produce said second composite sequence correspond to $S_{12}$ and $S_{22}$, respectively, with $S_{12}$ and $S_{22}$ being the second entries in the vectors $S_1$ and $S_2$, wherein amplification factors for said amplified ones of the first and second compensated sequences to produce said first combined sequence correspond to $R_{11}$ and $R_{21}$, wherein amplification factors for said amplified ones of the first and second compensated sequences to produce said second combined sequence correspond to $R_{12}$ and $R_{22}$, wherein said second canceler means includes first amplifier means with amplification factors $S_{11}$, $S_{21}$ to generate a first control sequence from said first and second received data sequences, and wherein said second canceler means includes second amplifier means with amplification factors $S_{12}$, $S_{22}$ to generate a second control sequence from said first and second received data sequences, both said first and said second control sequences controlling said second canceler means to cancel the FEXT interfering components and post-cursor intersymbol interfering components in said first and second received sequences, wherein $R_{11}$ and $R_{12}$ form a vector $R_1$; $R_{21}$ and $R_{22}$ form a vector $R_2$, and wherein $S_{11}$ and $S_{12}$ form a vector $S_1$; $S_{21}$ and $S_{22}$ form a vector $S_2$, with $$S_1 = \frac{C^+\theta_1}{m_1\kappa_1},$$

$$S_2 = \frac{C^+\theta_2}{m_2\kappa_2},$$

$$R_1 = m_1\theta_1,$$
$$R_2 = m_2\theta_2$$

wherein C is a 2×2 channel matrix defining transmission on the first and second lines, $\kappa_1$ and $\kappa_2$ are eigenvalues to the eigenvalue problem $$CC^+\theta_i = \kappa_i N\theta_i,$$

with N being the 2×2 covariance matrix of noise in the first and second received data sequences, respectively, and where the eigenvectors are $\theta_1$ and $\theta_2$ corresponding to $\kappa_1$ and $\kappa_2$, respectively, and $m_1$ and $m_2$ are representative of the root mean square noises in the first and second received data sequences, respectively.

13. The transceiver as recited in claim 12 wherein said $R_{11}$, $R_{12}$, $R_{21}$, and $R_{22}$ amplification factors as well as said $S_{11}$, $S_{12}$, $S_{21}$, and and $S_{22}$ amplification factors are all adjustable in accordance with the periodic solutions to said eigenvalue problem caused by variations in said noise components of said covariance matrix.

14. A transmission system having transceivers terminating each end of two transmission lines, each transceiver being arranged to transmit first and second data sequences originated by first and second data sources, respectively, over the first and second transmission lines, the lines being coupled to each transceiver by first and second hybrids each having transmit and receive ports, and wherein the receive ports of the first and second hybrids provide first and second received line signals, respectively, each having echo, noise, line distortion, NEXT, and FEXT interfering components, each transceiver comprising line buffer means, coupled to the first and second data sources, for generating a first composite sequence and a second composite sequence, said first composite sequence being formed from a combination of separately amplified versions of the first and second data sequences, and said second composite sequence being formed from another combination of separately amplified versions of the first and second data sequences, modulation means, coupled to said line buffer means, for generating first and second line carrier signals; for modulating said first line carrier signal with said first composite sequence to produce a first modulation signal and for modulating said second line carrier signal with said second composite sequence to produce a second modulation signàl; for supplying said first modulation signal to the transmit port of the first hybrid and for supplying said second modulation signal to the transmit port of the second hybrid, receive buffer means, coupled to the receive ports of the hybrids, for equalizing the first and second received line signals to produce first and second equalized received line signals, and for separately sampling said equalized first and second received line signals to produce first and second sampled line sequences, first canceler means, coupled to said line buffer means and the receive buffer means and being responsive to said first and second composite sequences, for canceling the echo and NEXT components in the first and second sampled line sequences to produce first and second input sequences, feed forward filter means for filtering the noise and the line distortion in said first and second input sequences to produce first and second compensated sequences, combiner means, coupled to said feed forward filter means, for generating a first combined sequence and a second combined sequence, said first combined sequence being formed from a combination of separately amplified versions of said first and second compensated sequences and for processing the first combined sequence by threshold detecting each of the elements of the first combined sequence to produce a first received data sequence; and said second combined sequence being formed from another combination of separately amplified versions of said first and second compensated sequences and for processing the second combined sequence by threshold detecting each of the elements of the second combined sequence to produce a second received data sequence, and second canceler means, coupled to said feed forward filter means and said combiner means and being responsive to said first and second received data sequences, for canceling the FEXT interfering components and post-cursor intersymbol interfering components in said first and second received sequences processed by the transceiver.

* * * * *